United States Patent
Kashiro et al.

(10) Patent No.: US 6,219,105 B1
(45) Date of Patent: Apr. 17, 2001

(54) VIDEO SIGNAL PROCESSING APPARATUS

(75) Inventors: Takao Kashiro; Shozo Fujii, both of Hirakatashi; Katuji Uro, Neyagawashi, all of (JP)

(73) Assignee: Matsushita Electric Industrial Co., Ltd. (JP)

(*) Notice: Subject to any disclaimer, the term of this patent is extended or adjusted under 35 U.S.C. 154(b) by 0 days.

(21) Appl. No.: 09/092,877

(22) Filed: Jun. 8, 1998

(30) Foreign Application Priority Data

Jun. 10, 1997 (JP) .................................. 9-152114

(51) Int. Cl.[7] ............................................ H04N 5/06
(52) U.S. Cl. .................. 348/521; 348/524; 348/536; 348/571; 348/572; 348/607; 348/497
(58) Field of Search .................. 348/521, 522, 348/523, 524, 500, 511, 536, 537, 571, 572, 573, 607, 497, 910, 614, 724; 386/12, 13, 17, 84, 85; H04N 5/06

(56) References Cited

U.S. PATENT DOCUMENTS

| | | | |
|---|---|---|---|
| 5,148,276 | * 9/1992 | Furumiya et al. | 358/153 |
| 5,293,231 | * 3/1994 | Elberbaum et al. | 348/521 |
| 5,305,106 | 4/1994 | Fukushima et al. | 348/521 |
| 5,453,795 | * 9/1995 | Tults | 348/521 |
| 5,486,866 | * 1/1996 | Helfrich et al. | 348/521 |
| 5,627,596 | * 5/1997 | Shiramizu | 348/536 |
| 5,671,260 | * 9/1997 | Yamauchi et al. | 375/372 |
| 5,754,250 | * 5/1998 | Cooper | 348/525 |
| 5,777,686 | * 7/1998 | Jennes et al. | 348/537 |
| 5,787,221 | * 7/1998 | Matsumi et al. | 386/33 |
| 5,835,155 | * 11/1998 | Jennes et al. | 348/536 |
| 5,999,226 | * 12/1999 | Choi | 348/497 |

FOREIGN PATENT DOCUMENTS

| | | |
|---|---|---|
| 62-82773 | 4/1987 | (JP) . |
| 5-327488 | 12/1993 | (JP) . |
| 9-130823 | 5/1997 | (JP) . |

* cited by examiner

Primary Examiner—Reinhard Eisenzopf
Assistant Examiner—Jean W. Désir
(74) Attorney, Agent, or Firm—Parkhurst & Wendel, L.L.P (57) ABSTRACT

A video signal processing apparatus comprising an oscillating unit for outputting a signal of a stable frequency, a counting unit for counting the period of a cycle of a signal supplied from the outside based on the signal output by the oscillating unit, a clock number calculating unit for calculating the number of clocks in a line based on a result of counting by the counting unit, a comparing unit for comparing the number of clocks calculated by the clock number calculating unit with a threshold to decide which is larger, a switching unit for deciding the number of clocks in the next operation by switching to the number of clocks calculated by the clock number calculating unit if the calculated number of clocks is larger than the threshold, or deciding the number of clocks in the next operation by holding the number of clocks in a line in the current operation as it is, and a synchronizing signal generating unit for, based on the number of clocks in operation decided by the switching unit and the signal output by the oscillating unit, generating a synchronizing signal for a video signal, thereby preventing a shake of a frame signal supplied from the outside from directly affecting a synchronizing signal to be generated for a video signal so that a visually adverse shake of image on a TV screen can be suppressed.

4 Claims, 5 Drawing Sheets

VIDEO SIGNAL PROCESSING APPARATUS

FIELD OF THE INVENTION

The present invention relates to a video signal processing apparatus for modulating a digitized video signal synchronized with a frame signal supplied from the outside to convert the digitized video signal to an analog video signal which is displayed on a TV set.

BACKGROUND OF THE INVENTION

Recently, a broadcast station and the like increasingly use digital video tape recorders for business purposes which digitize video signals to record and play back. On the other hand, video cameras for personal use which digitize video signals to record are placed on the market now.

In those devices, only significant pixels of a video signal are recorded. So in playing back a video signal, a synchronizing signal, a burst signal and the like are required to be added to the video signal according to a reference signal, such as a synchronizing signal from the inside or the outside.

Japanese Patent Published Application No. Sho 62-82773 (1987) discloses a synchronizing signal adjustment circuit which changes timings of synchronizing an internal video signal with a synchronizing signal of an external video signal.

As precise the stability of frequency of a burst signal as that of crystal is required of the synchronizing signal adjustment circuit disclosed, when generating an external synchronizing signal. At the same time, a synchronizing signal to be added to a luminance signal Y must be synchronized with a frame signal supplied from the outside. For this reason, in modulating a chrominance signal, color difference signals Cr and Cb are required to be converted to analog signals before the external synchronizing signal is generated.

However, the synchronizing signal adjustment circuit disclosed requires analog circuits, such as an oscillator, including a crystal and oscillating at the frequency of a color sub-carrier (3.579549 MHz), a multiplier, and an adder. This requirement makes the circuit structure more complicated, and what is more, the stability against changes in temperature characteristics and a power voltage is difficult to be achieved.

In general, digitized video signals, i.e., a luminance signal Y and two kinds of color difference signals Cr and Cb, are sampled with a frequency of 13.5 MHz. For this reason, the video signal and the color sub-carrier easily cause a beat. This often leads to deterioration of characteristics of a video signal.

To cope with the above-described problems, I have proposed, in my prior art Japanese Patent Published Application No. Hei 9-130823(1997), a video signal processing apparatus of which an encoder for generating a luminance signal comprises only digital circuits even when outputting a video signal synchronized with the outside, and which can stably add a synchronizing signal able to synchronize on a monitor to a luminance signal.

Figure 5:
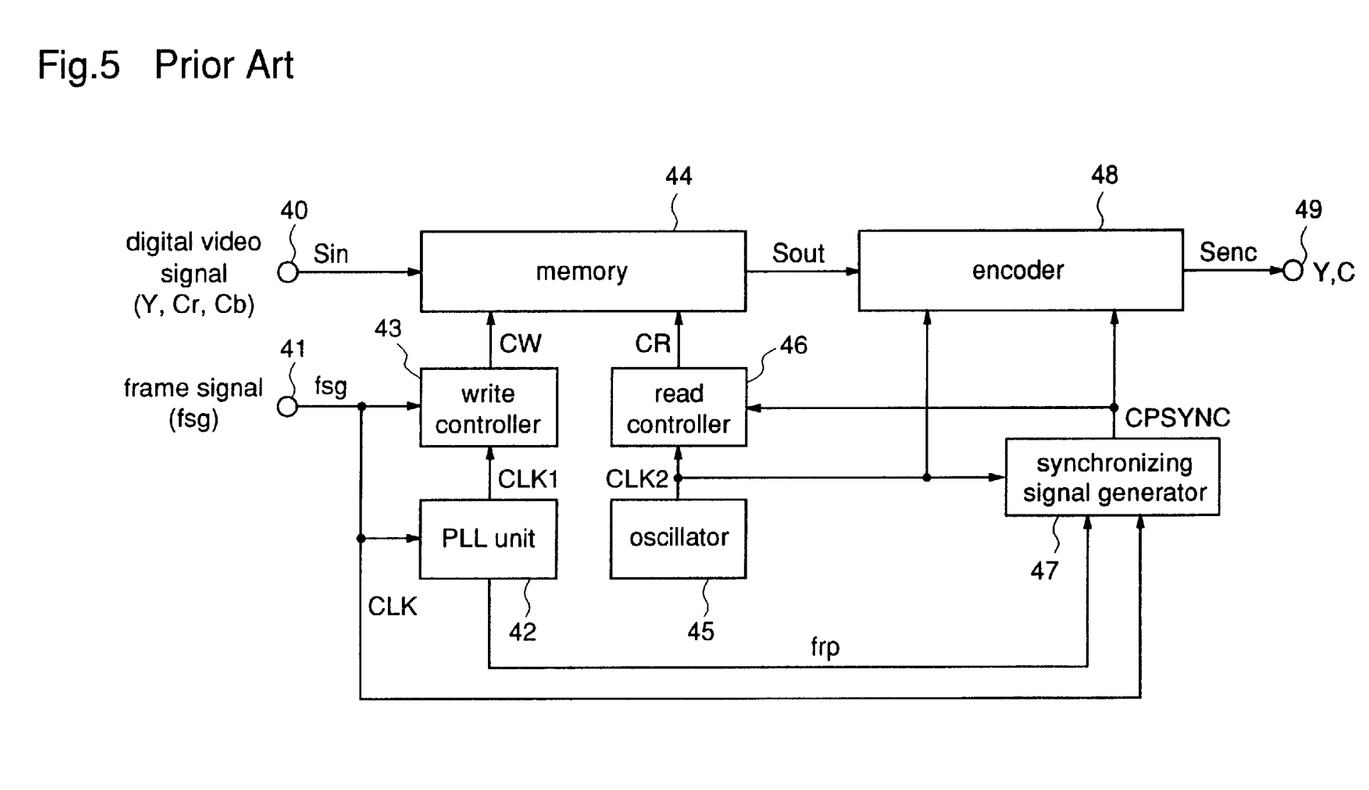
FIG. 5 is a block diagram showing a structure of a video signal processing apparatus in a prior art.

The structure of this video signal processing apparatus is shown in FIG. 5. FIG. 5 is a block diagram illustrating a structure of a conventional video signal processing apparatus.

The conventional video signal processing apparatus comprises a first input terminal 40, a second input terminal 41, a memory 44, a PLL unit 42, a write controller 43, an oscillator 45, a synchronizing signal generator 47, a read controller 46, an encoder 48, and an output terminal 49. The first input terminal 40 is supplied with a digitized video signal (hereinafter referred to as "digital video signal") Sin comprising a luminance signal and two sorts of color difference signals Cr and Cb. The memory 44 temporarily stores the digital video signal Sin input through the first input terminal 40. The PLL unit 42 generates a clock signal CLK1 and a frame signal frp synchronizing with a frame signal fsg input through the second input terminal 41. The write controller 43 generates a control signal CW of writing the digital video signal Sin to the memory 44 according to a frame signal fsg and a clock signal CLK1. The oscillator 45 generates a clock signal CLK2 having crystal precision using a crystal, and outputs the clock signal. The synchronizing signal generator 47 calculates a number of clocks based on the clock signal CLK2 input within a cycle of the frame signal fsg, and from the result, generates a synchronizing signal CPSYNC to be added to a video signal Senc which is the output of the apparatus. The read controller 46 generates a control signal CR for reading out data from the memory 44 according to the clock signal CLK2 and the synchronizing signal CPSYNC. The encoder 48 adds the synchronizing signal CPSYNC supplied from the synchronizing signal generator 47 to a luminance signal Y of a digital video signal Sout supplied from the memory 44, and converts the resulting signal to an analog signal, while modulating two kinds of color difference signals Cr and Cb of the digital video signal Sout using the clock signal CLK2 to produce a chrominance signal, and converting the chrominance signal to an analog signal. The output terminal 49 is supplied with an output signal of the encoder 48, i.e., an analog luminance signal and two sorts of analog chrominance signals.

The operation of the conventional video signal processing apparatus will be explained.

The frame signal of around 30 Hz is supplied through the input terminal 41 to the PLL unit 42. The PLL unit 42 generates the frame signal frp having 50% duty, based on the clock signal CLK1 synchronizing with the frame signal fsg, and the clock signal CLK2.

The write controller 43 generates the control signal CW for the memory 44 according to the frame signal fsg supplied through the input terminal 41 and the clock signal CLK1 supplied from the PLL unit 42. According to the generated write control signal CW, the write controller 43 stores the digital video signal Sin, supplied through the input terminal 40, in the memory 44.

The oscillator 45 includes a crystal, and outputs the very stable clock signal CLK2 of 27 MHz of which the frequency deviation is 20 ppm or below, to the read controller 46.

The synchronizing signal generator 47 measures the period of a cycle of the frame signal fsg using the clock signal CLK2 from the oscillator 45. To be specific, an internal counter is reset at a rising edge of the frame signal fsg, and counts up at a rising edge of the clock signal CLK2. The value of the counter is stored in a register at a next rising edge of the frame signal fsg. The number of clocks within a line is defined by the integer part of the value resulting from dividing the number of lines contained in a cycle of the frame signal fsg by the number of counts held in the register, while the remainder defines the skew. Afterwards, the synchronizing signal generator 47 generates the synchronizing signal CPSYNC according to the number of clocks in a line and the clock signal CLK2 from the oscillator 45.

The read controller 46 generates the control signal CR for reading the data stored in the memory 44 according to the synchronizing signal CPSYNC generated in the synchronizing signal generator 47 and the clock signal CLK2 supplied from the oscillator 45. The digital video signal Sout is read out from the memory 44 according to the control signal CR generated.

The digital video signal Sout has the same sequence of data as the video signal Senc. The timing of reading the digital video signal Sout is adjusted. That is, the jitter between the frame signals fsg and frp is absorbed by the memory 44.

The digital video signal Sout read out from the memory 44 is supplied to the encoder 48. The encoder 48 adds the synchronizing signal CPSYNC to the luminance signal Y of the digital video signal Sout, and converts the result to an analog signal, while modulating two kinds of color difference signals Cr and Cb of the digital video signal Sout using the clock signal CLK2 to produce a chrominance signal, and converting the chrominance signal to an analog signal. The output signal of the encoder 48 is supplied to the output terminal 49.

In the foregoing conventional video signal processing apparatus, fluctuation of the frame signal supplied from the outside changes the length of a line, i.e., the number of clocks, which causes the displayed image to shift horizontally. The direction of the horizontal shift is not one-way. Therefore, an image on a TV screen moves from side to side. It is a visually adverse effect. Therefore, it is required to improve the picture quality Further, in the foregoing conventional video signal processing apparatus, the timing of outputting the digital video signal Sout is adjusted using the memory 44, so skews can be prevented from occurring. However, a memory is so expensive that the whole apparatus cannot be provided at a low cost. The board of the apparatus for mounting a memory becomes so large that the whole apparatus cannot be made small in size.

SUMMARY OF THE INVENTION

It is an object of the present invention to provide a video signal processing apparatus in which fluctuation of a frame signal supplied from the outside does not affect generation of a synchronizing signal for a video signal, so the amount of skew and the side-to-side shake are suppressed so that visual deterioration can be avoided on a TV screen, and which can be made small in size, and can be produced at a low cost.

Other objects and advantages of the present invention will become apparent from the detailed description desired hereinafter; it should be understood, however, that the detailed description and specific embodiment are desired by way of illustration only, since various changes and modifications within the scope of the invention will become apparent to those skilled in the art from this detailed description.

According to a first aspect of this invention, there is provided a video signal processing apparatus comprising:

an oscillating unit for outputting a signal of a stable frequency;

a counting unit for counting the period of a cycle of a signal supplied from the outside based on the signal output by said oscillating unit;

a calculating unit for calculating the number of clocks in a line based on a result of counting by said counting unit;

a comparing unit for comparing the number of clocks calculated by said clock number calculating unit with a threshold to decide which is larger;

an operating clock number deciding unit for deciding the number of clocks in a next operation by switching to the number of clocks calculated by said clock number calculating-unit if the calculated number of clocks is larger than the threshold, or deciding the number of clocks in the next operation by holding the number of clocks in a line in a current operation as it is; and a synchronizing signal generating unit for, based on the number of clocks in operation decided by said operating clock number deciding unit and the signal output by said oscillating unit, generating a synchronizing signal for a video signal.

As a result, when the amplitude of a shake of a field or frame supplied from the outside is small, if the number of clocks does not exceed the threshold, the number of clocks in the next operation is not changed, thereby removing a side-to-side shake of image on a TV screen, and therefore, making it possible to display video stably.

According to a second aspect of this invention, there is provided a video signal processing apparatus comprising:

an oscillating unit for outputting a signal of a stable frequency;

a counting unit for counting the period of a cycle of a signal supplied from the outside based on the signal output by said oscillating unit;

a filtering unit for receiving and filtering the number of counts counted by said counting unit;

a clock number calculating unit for calculating the number of clocks in a line based on the result of filtering by said filtering unit;

a synchronizing signal generating unit for, based on the number of clocks calculated by said clock number calculating unit and the signal output by said oscillating unit, generating a synchronizing signal for a video signal.

As a result, when the rate of a shake of a field or frame supplied from the outside is quick, the number of clocks is subjected to filtering to be smoothed, thereby removing a side-to-side shake of image on a TV screen, and therefore, making it possible to display video stably.

According to a third aspect of this invention, there is provided a video signal processing apparatus comprising:

an oscillating unit for outputting a signal of a stable frequency;

an operating clock number calculating unit for calculating the number of clocks in operation;

an internal signal generating unit for generating a dividing signal for dividing a frame or a dividing signal for dividing a field, based on the number of clocks in operation calculated by said operating clock number calculating unit and a signal output by said oscillating unit;

a time difference measuring unit for measuring a difference in time between the dividing signal generated by said internal signal generating unit, and a dividing signal for dividing a frame or a dividing signal for dividing a field, supplied from the outside;

a filtering unit for receiving and filtering a signal output by said time difference measuring unit; and a synchronizing signal generating unit for, based on a result of filtering by said filtering unit and the number of clocks in operation calculated by said operating clock number calculating unit, generating a synchronizing signal for a video signal to match the result of filtering by said filtering unit to the amount of skew of a current field or frame.

As a result, when the high frequency component of a shake of a field or frame supplied from the outside is smoothed by filtering, so skew on a TV screen is suppressed, not that the shake of the frame signal supplied from the outside is output as it is, thereby removing the amount of skew and a shake along a direction of skew occurring, and therefore, making it possible to display video stably.

According to a fourth aspect of this invention, there is provided a video signal processing apparatus comprising:

an oscillating unit for outputting a signal of a stable frequency;

an operating clock number calculating unit for calculating the number of clocks in operation;

an internal signal generating unit for generating a dividing signal for dividing a frame or a dividing signal for dividing a field, based on the number of clocks in operation calculated by said operating clock number calculating unit and a signal output by said oscillating unit;

a time difference measuring unit for measuring a difference in time between the dividing signal generated by said internal signal generating unit, and a dividing signal for dividing a frame or a dividing signal for dividing a field;

said operating clock number calculating unit controlling the length of a line by adjusting the number of clocks in the next operation, the time difference measured by said time difference measuring unit being regarded as error information, to reduce the error information.

As a result, a circuit of a small scale removes a side-to-side shake of video on a TV screen, caused by a shake of a frame signal supplied from the outside, thereby making it possible to display video stably.

DETAILED DESCRIPTION OF THE PREFERRED EMBODIMENTS

Figure 1:
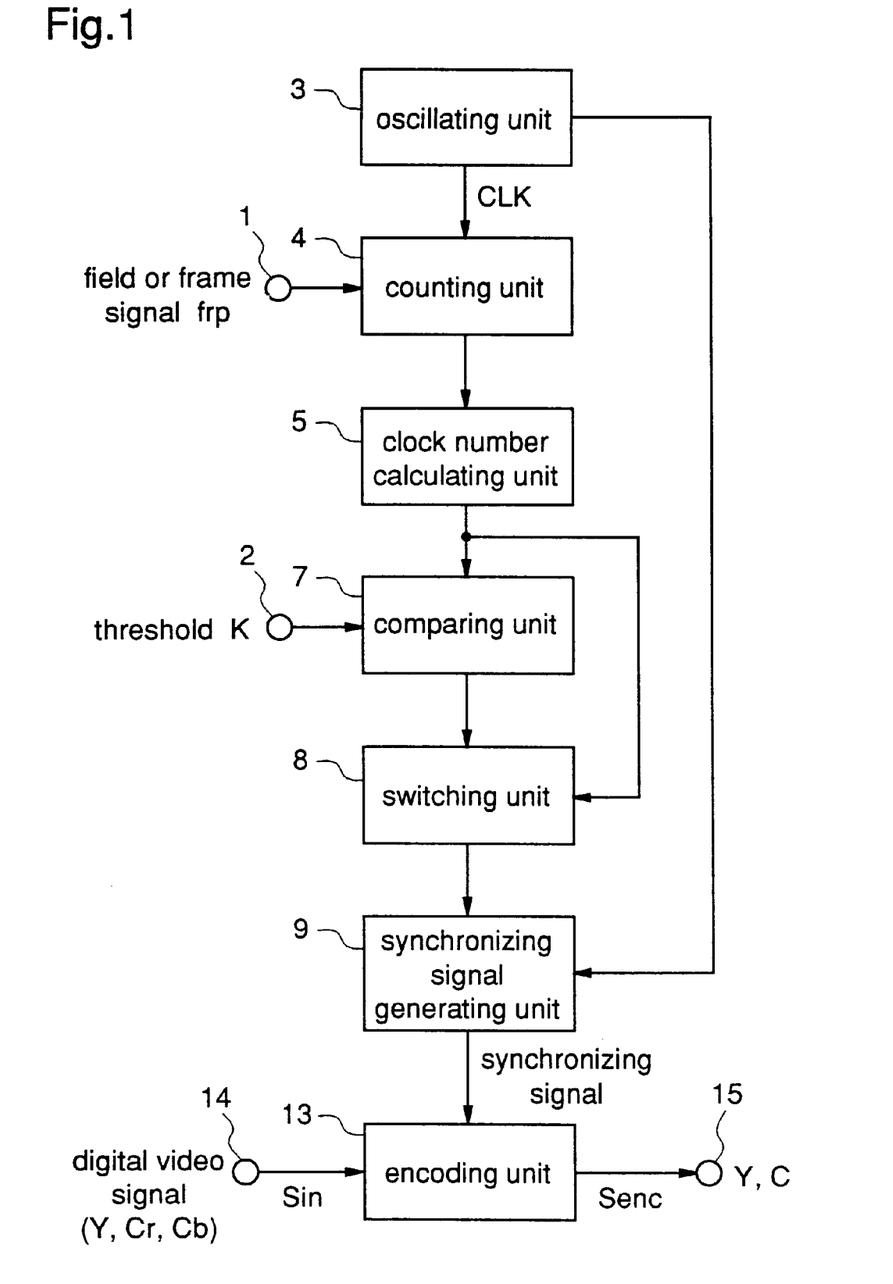
FIG. 1 is a block diagram showing a structure of a video signal processing apparatus in accordance with a first embodiment of this invention.

Embodiments of this invention will be explained referring to accompanying drawings.
[Embodiment 1]
FIG. 1 is a block diagram showing a structure of a video signal processing apparatus in accordance with a first embodiment of this invention.

The video signal processing apparatus comprises a first input terminal 1, a second input terminal 2, an oscillating unit 3, a counting unit 4, a clock number calculating unit 5, a comparing unit 7, a switching unit 8, a synchronizing signal generating unit 9, a third input terminal 14, an encoding unit 13, and an output terminal 15. The first input terminal 1 is supplied with a field or frame signal frp. The second input terminal 2 is supplied with a threshold K. The oscillating unit 3 outputs a clock signal CLK having crystal precision. The counting unit 4 counts the period of a cycle of the field or frame signal frp supplied through the first input terminal 1. The clock number calculating unit 5 calculates the number of clocks within a line based on the resulting number of counts of the counting unit 4. The comparing unit 7 compares the number of clocks calculated by the clock number calculating unit 5 with the threshold K supplied through the second input terminal 2 to decide which is larger. The switching unit 8 switches the number of clocks in the next operation to the calculated number of clocks if a result of comparison of the comparing unit 7 is that the calculated number of clocks is larger than the threshold K, while holding the current number of clocks as the number of clocks in the next operation if the calculated number of clocks is smaller than the threshold K. The synchronizing signal generating unit 9 generates a synchronizing signal for a video signal based on the number of clocks in operation decided by the switching unit 8, and the signal output from the oscillating unit 3. The third input terminal 14 is supplied with a digitized video signal Sin comprising a luminance signal Y and two sorts of color difference signals Cr and Cb. The encoding unit 13 adds the synchronizing signal supplied from the synchronizing signal generating unit 9 to the luminance signal Y of the digital video signal Sin, and converts the result to an analog signal, while modulating the two sorts of color difference signals Cr and Cb of the digital video signal Sin to produce a chrominance signal, and converting the chrominance signal to an analog signal. The output terminal 15 is supplied with the output signals of the encoding unit 13, i.e., the analog luminance signal and the analog chrominance signal.

A description will be given of how the video signal processing apparatus operates.

The field or frame signal frp is input to the counting unit 4 through the first input terminal 1, resetting the counting unit 4 at a rising edge of the field or frame signal frp.

The oscillating unit 3 outputs the clock signal CLK with crystal precision to the counting unit 4.

When receiving the clock signal CLK, the counting unit 4 counts up at a rising edge of the clock signal CLK, holding the number of counts for each field or frame to be output to the clock number calculating unit 5.

Thereafter, the clock number calculating unit 5, based on the number of counts from the counter 4, calculates the number of clocks in a line, and outputs the result to the comparing unit 7.

The comparing unit 7 compares the number of clocks calculated by the clock number calculating unit 5 with the threshold K supplied through the second input terminal 2 to decide which is larger, and outputs the result of the comparison to the switching unit 8.

The switching unit 8, according to the result of the comparison of the comparing unit 7, decides the number of clocks in the next operation, and outputs it to the synchronizing signal generating unit 9. Specifically, if the calculated number of clocks is larger than the threshold K, the number of clocks in the next operation is switched to the calculated number of clocks. On the other hand, if the calculated number of clocks is smaller than the threshold K, the current number of clocks in a line is held as the number of clocks in the next operation.

The synchronizing signal generating unit 9 generates a synchronizing signal for a video signal based on the number of clocks in operation decided by the switching unit 8 and the signal output from the oscillating unit 3, and outputs the synchronizing signal to the encoding unit 13.

The digital video signal Sin is input through the third input terminal 14 to the encoding unit 13. The encoding unit 13 adds the synchronizing signal to a luminance signal of the digital video signal Sin and converts the result signal to an analog signal, while modulating two sorts of color difference signals Cr and Cb of the digital video signal Sin to produce a chrominance signal and converting the chrominance signal to an analog signal. The output signal of the encoding unit 13 is supplied to the output terminal 15.

In the first embodiment, the period of a cycle of a field or frame signal supplied from the outside, which have a stable frequency, is counted, and the number of clocks calculated from the resulting number of counts is compared with a threshold to decide which is larger. If the calculated number of clocks does not exceed the threshold, the number of clocks in the current operation is adopted as the number of clocks in the next operation, while if the calculated number of clocks is larger than the threshold, the number of clocks in the next operation is switched to the calculated number of clocks. A synchronizing signal is produced according to the decided number of clocks in the next operation.

Accordingly, when the field or frame signal supplied from the outside has a small degree of fluctuation, that is, the change in the length of a line represented by the number of clocks is small between consecutive frames, the calculated number of clocks becomes below the threshold, so the number of clocks in the next operation does not change, and the length of a line can remain constant. In a prior art, when the degree of fluctuation of a field or frame signal supplied from the outside is small, the side-to-side shake of video on a TV screen occurs due to fluctuation of the length of a line between each field or frame. The video signal processing apparatus in accordance with this embodiment can prevent the side-to-side shake, thereby displaying video on the TV screen stably.

Further, when the degree of fluctuation of a field or frame signal is large, the calculated number of clocks exceeds the threshold, so the length of a line can be made follow up changes in the field or frame signal, thereby displaying normal video on a TV screen.

It should be noted that the threshold K supplied from the outside may has any number of sorts of values and be selected freely. The threshold can be decided based on experiments or simulations so that the threshold should take a value that does not cause visually something wrong. For instance, any value within around ±3 clocks can be set to the threshold for the number of clocks in the current operation.

[Embodiment 2]

Figure 2:
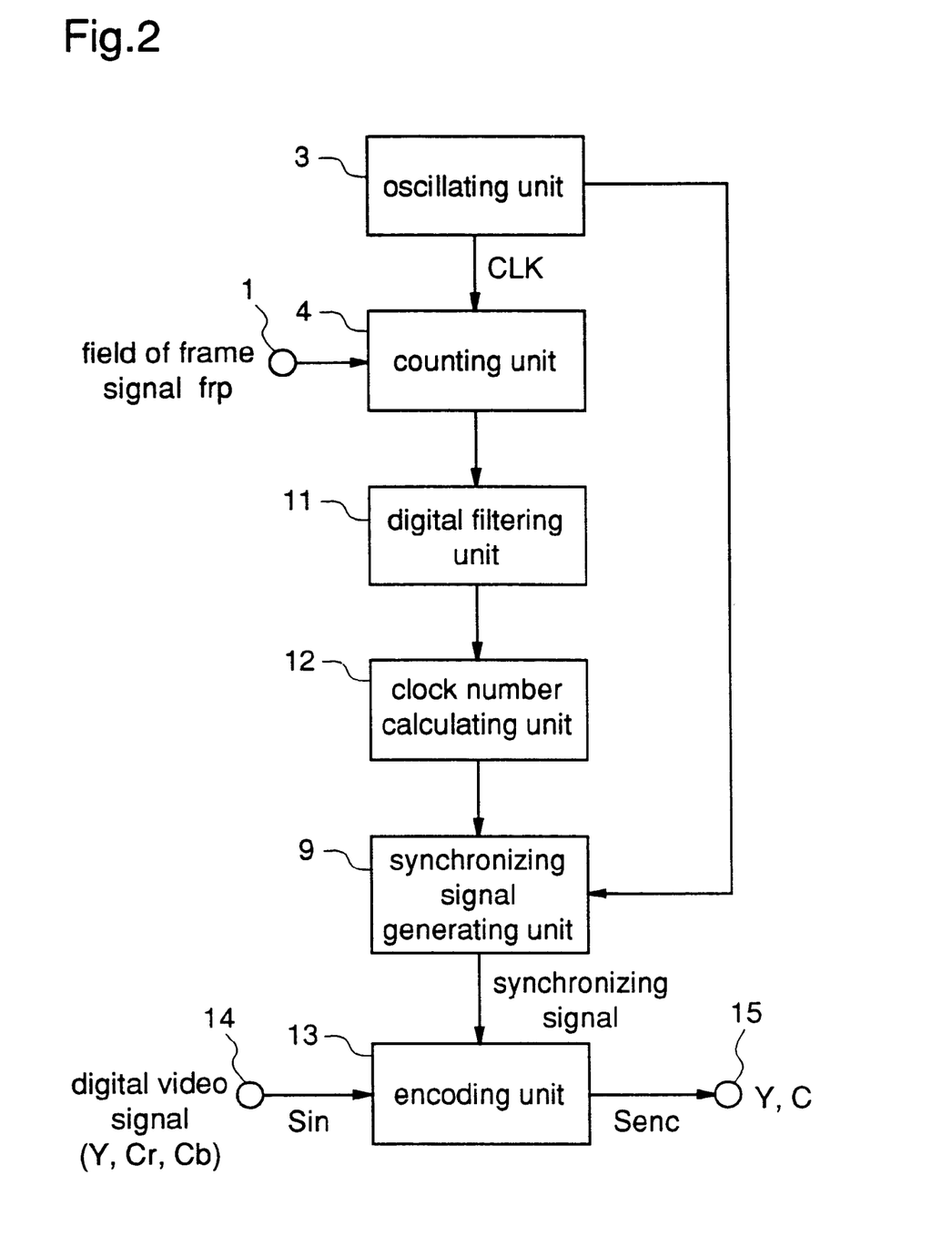
FIG. 2 is a block diagram showing a structure of a video signal processing apparatus in accordance with a second embodiment of this invention.

FIG. 2 is a block diagram showing a structure of a video signal processing apparatus in accordance with a second embodiment.

The video signal processing apparatus comprises a first input terminal 1, an oscillating unit 3, a counting unit 4, a digital filtering unit 11, a clock number calculating unit 12, a synchronizing signal generating unit 9, a third input terminal 14, an encoding unit 13, and an output terminal 15. The first input terminal 1 is supplied with a field or frame signal frp. The oscillating unit 3 outputs a clock signal CLK having crystal precision. The counting unit 4 counts the period of a cycle of the field or frame signal frp supplied through the first input terminal 1. The digital filtering unit 11 receives and filters the number of counts by the counter 4. The clock number calculating unit 12 calculates the number of clocks within a line based on a result of filtering by the digital filtering unit 11. The synchronizing signal generating unit 9 generates a synchronizing signal for a video signal based on the number of clocks calculated by the clock number calculating unit 12, and the signal output from the oscillating unit 3. The third input terminal 14 is supplied with a digitized video signal Sin comprising a luminance signal Y and two sorts of color difference signals Cr and Cb. The encoding unit 13 adds the synchronizing signal supplied from the synchronizing signal generating unit 9 to the luminance signal Y of the digital video signal Sin, and converts the result to an analog signal, while modulating the two sorts of color difference signals Cr and Cb of the digital video signal Sin to produce a chrominance signal, and converting the chrominance signal to an analog signal. The output terminal 15 is supplied with the output signal of the encoding unit 13, i.e., the analog luminance signal and the analog chrominance signal.

A description will be given of how the video signal processing apparatus operates.

The field or frame signal frp is input to the counting unit 4 through the first input terminal 1, resetting the counting unit 4 at a rising edge of the field or frame signal frp.

The oscillating unit 3 outputs the clock signal CLK with crystal precision to the counting unit 4.

When receiving the clock signal CLK, the counting unit 4 counts up at a rising edge of the clock signal CLK, holding the number of counts for each field or frame to be output to the digital filtering unit 11.

Thereafter, the digital filtering unit 11 smoothes the number of counts from the counter 4, and outputs the result to the clock number calculating unit 12. That is, the digital filtering unit 11 removes high frequency components of fluctuation of the field or frame signal supplied from the outside.

The clock number calculating unit 12, based on the value output from the digital filtering unit 11, calculates the number of clocks in a line, and outputs the result to the synchronizing signal generating unit 9.

The synchronizing signal generating unit 9 generates a synchronizing signal for a video signal based on the number of clocks calculated by the clock number calculating unit 12 and the signal output from the oscillating unit 3, and outputs the synchronizing signal to the encoding unit 13.

The digital video signal Sin is supplied from the third input terminal 14 to the encoding unit 13. The encoding unit 13 adds the synchronizing signal to a luminance signal of the digital video signal Sin, and converts the result signal to an analog signal, while modulating two sorts of color difference signals Cr and Cb of the digital video signal Sin to produce a chrominance signal, and converting the chrominance signal to an analog signal. The output signal of the encoding unit 13 is supplied to the output terminal 15.

That is, in the second embodiment, the period of a cycle of a field or frame signal of a stable frequency, supplied from the outside, is counted, and the result is subjected to filtering to be smoothed. Thereafter, the number of clocks in a line is calculated, and according to the calculated number of clocks, a synchronizing signal is generated.

Accordingly, when the rate of fluctuation of a field or frame signal supplied from the outside is high, the number of clocks in operation is filtered to be smoothed. In other words, when a field or frame signal supplied from the outside fluctuates at a high rate, change in the number of clocks is rejected, so the previous number of clocks in a line is used as it is. Therefore, when the length of a line, i.e., the number of clocks, changes between fields or frames, the operating clock's following up the change in the length of a line is delayed so that the quick change in the length of a line is suppressed, thereby removing a side-to-side shake of video on a TV screen. As a result, video can be stably displayed on a TV screen.

[Embodiment 3]

Figure 3:
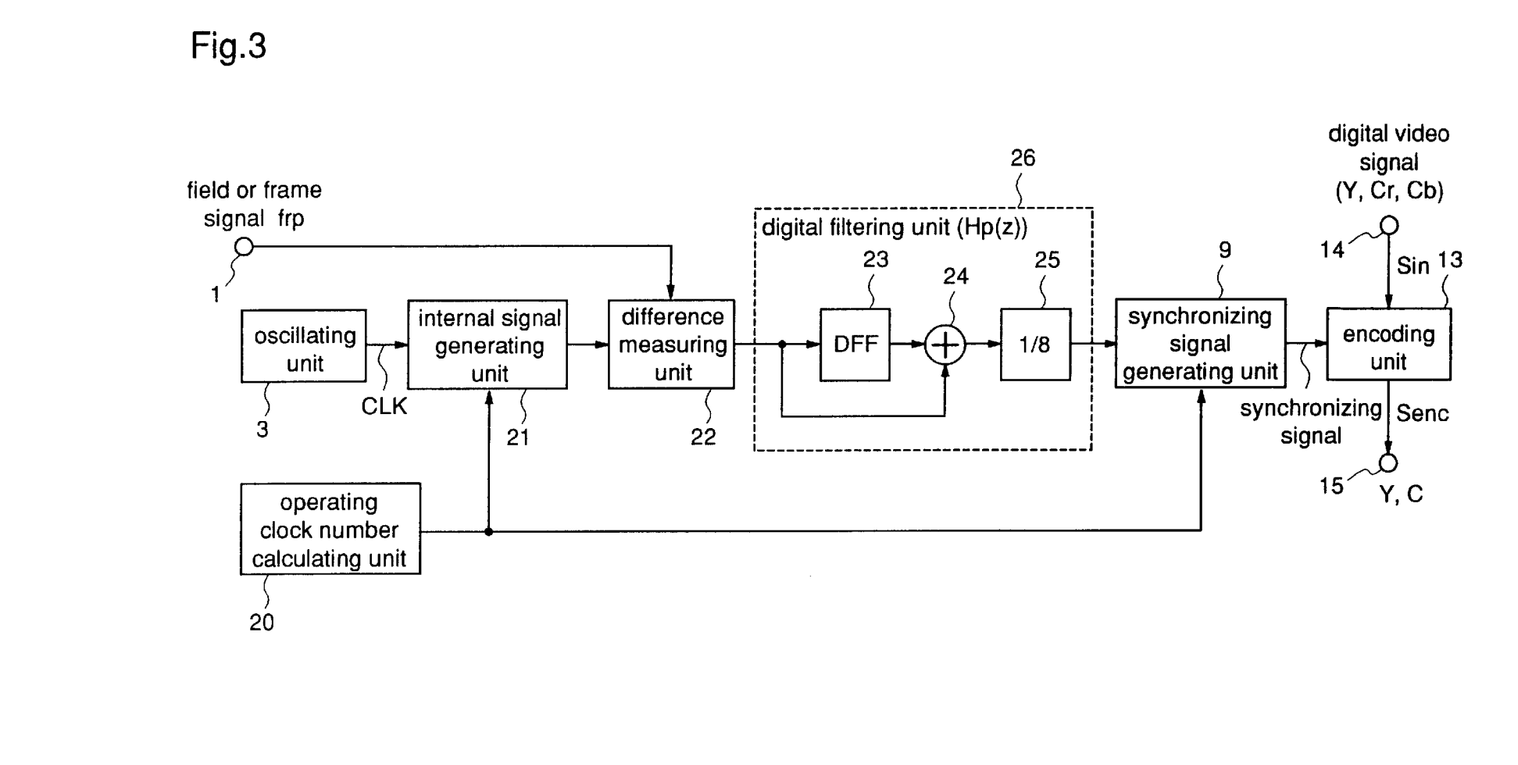
FIG. 3 is a block diagram showing a structure of a video signal processing apparatus in accordance with a third embodiment of this invention.

FIG. 3 is a block diagram showing a structure of a video signal processing apparatus in accordance with a third embodiment of this invention.

The video signal processing apparatus comprises an input terminal 1, an oscillating unit 3, an operating clock number calculating unit 20, an internal signal generating unit 21, a difference measuring unit 22, a digital filtering unit 26, a synchronizing signal generating unit 9, a second input terminal 14, an encoding unit 13, and an output terminal 15. The input terminal 1 is supplied with a field or frame signal frp. The oscillating unit 3 outputs a clock signal CLK having crystal precision. The operating clock number calculating unit 20 calculates the number of clocks in operation. The internal signal generating unit 21, based on the number of clocks in operation calculated in the operating clock number calculating unit 20 and the clock signal CLK output from the oscillating unit 3, generates a dividing signal for dividing a frame or a dividing signal for dividing a field (hereinafter referred to as "internally generated dividing signal" generally for both signals). The difference measuring unit 22 measures a difference in time between the internally generated dividing signal generated in the internal signal generating unit 21, and a dividing signal for dividing a frame or a dividing signal for dividing a field, supplied from the input terminal 1, (hereinafter referred to as "external input dividing signal" generally for both signals). The digital filtering unit 26 receives and filters the signal output from the difference measuring unit 22. The synchronizing signal generating unit 9 generates a synchronizing signal for a video signal, based on a result of filtering in the digital filtering unit 26 and the number of clocks in operation calculated in the operating clock number calculating unit 20, to make the result of filtering in the digital filtering unit 26 match the amount of skew of a current field or frame. The second input terminal 14 is supplied with a digitized video signal Sin comprising a luminance signal Y and two sorts of color difference signals Cr and Cb. The encoding unit 13 adds the synchronizing signal supplied from the synchronizing signal generating unit 9 to the luminance signal Y of the digital video signal Sin, and converts the result to an analog signal, while modulating the two sorts of color difference signals Cr and Cb of the digital video signal Sin to produce a chrominance signal, and converting the chrominance signal to an analog signal. The output terminal 15 is supplied with the output signal of the encoding unit 13, i.e., the analog luminance signal and the analog chrominance signal.

The digital filtering unit 26, the output of the measuring unit 22 being represented by D(n), has transfer characteristics of $(1+Z^{-1})/8$. To be specific, the digital filtering unit 26 comprises a DFF 23 holding time difference data in the period of a field or frame, an adding unit 24 adding current time difference data held in the DFF 23 and time difference data a field or frame before, and a dividing unit 25 dividing a result of the addition in the adding unit 24 by eight.

The operation of the video signal processing apparatus will be described.

The oscillating unit 3 outputs a clock signal CLK with crystal precision. The operating clock number calculating unit 20 calculates the number of clocks in operation.

The internal signal generating unit 21 generates an internally generated dividing signal, based on the number of clocks in operation calculated in the operating clock number calculating unit 20 and the clock signal CLK output from the oscillating unit 3.

The difference measuring unit 22 measures a difference in the time of the internally generated dividing signal generated in the internal signal generating unit 21 and the external input dividing signal, supplied through the input terminal 1. Thereby, the time difference between an external signal having jitter or deviation, and an internal signal automatically generated, is detected for each field or frame.

A description will be given of expressions about the process of the digital filtering unit 26. K(n) represents the length of a field or frame generated based on a stable clock signal CLK. In this case, the length is the number of clocks, and K(n) is fixed to a constant value, K858, and the amount of skew is represented by S(n), and then $$K(n)=K858+S(n).$$

F(n) represents the length of a dividing signal for dividing a field or frame input to the input terminal. Error of each division is represented by D(n), and then $$D(n)=D(n-1)+F(n-1)-K(n-1)=D(n-1)+F(n-1)-(K858+S(n-1)),$$

where

D(n): current error

D(n−1): error a division before.

Further, the amount of jitter of each field or frame is represented by J(n), and then $$J(n)=F(n-1)-K858,$$

and then, $$D(n)=D(n-1)+F(n-1)-(K858+S(n-1))=D(n-1)+J(n)-S(n-1) \quad (1)$$

The expression (1) is Z-transformed, so $$(1-z^{-1})\cdot D(z)=J(z)-z^{-1}S(z).$$

S(n) can be defined as a function of previous D(n)s, that is, $$S(n)=f(D(n), D(n-1), D(n-2), \ldots ).$$

This is Z-transformed, and if a transfer function for D→S is represented by Hp(z), that is, $$S(z)=Hp(z)\cdot D(z). \quad (2)$$

On the other hand, if a transfer function of f characteristics of jitter to f characteristics of skew is represented by Hs(z), i.e., $$S(z)=Hs(z)\cdot J(z). \quad (3)$$

From the expressions (1) and (3), $$(1-z^{-1})\cdot D(z) = \left(\frac{1}{Hs(z)} - z^{-1}\right)\cdot S(z) \quad (4)$$

$$= \frac{(1-z^{-1}\cdot Hs(z))}{Hs(z)}\cdot S(z)$$

$$S(z) = Hs(z)\cdot \frac{(1-z^{-1})}{1-z^{-1}\cdot Hs(z)}\cdot D(z)$$

are obtained.

For characteristics Hs(z) realized by the expression (4), an expression of D to S is defined. Hs(z) is obtained from an expression (5) below, no matter what characteristics is, $$Hp(z) = \frac{Hs(z) \cdot (1-z^{-1})}{1-z^{-1} \cdot Hs(z)}. \quad (5)$$

As a second characteristics, to realize $$Hs(z) = \frac{(1-\alpha+\beta)}{2} \cdot \frac{(1+z^{-1})}{(1-\alpha \cdot z^{-1} + \beta \cdot z^{-2})},$$

the following expression must be satisfied, $$Hp(z) = k \cdot \frac{(1+z^{-1})}{(1-\alpha \cdot z^{-1}+\beta \cdot z^{-2})} \cdot \frac{(1-z^{-1})}{1-k \cdot z^{-1} \cdot \frac{(1+z^{-1})}{(1-\alpha \cdot z^{-1}+\beta \cdot z^{-2})}}$$

$$= \frac{1-\alpha+\beta}{2} \cdot \frac{(1-z^{-2})}{1 - \frac{(1+\alpha+\beta)}{2} \cdot z^{-1} - \frac{(1-\alpha-\beta)}{2} \cdot z^{-2}}$$

Here, assuming the $\alpha=\frac{3}{4}$, and $\beta=\frac{1}{4}$, $$Hp(z) = \frac{1}{4} \cdot \frac{(1-z^{-2})}{(1-z^{-1})}$$

$$= \frac{1}{4} \cdot (1+z^{-1})$$

is obtained.

Here, assuming that $\alpha=\frac{7}{8}$, and $\beta=\frac{1}{8}$, $$Hp(z) = \frac{1}{8} \cdot \frac{(1-z^{-2})}{(1-z^{-1})}$$

$$= \frac{1}{8} \cdot (1+z^{-1})$$

is obtained.

Here, assuming that $\alpha=\frac{15}{16}$, and $\beta=\frac{1}{16}$, $$Hp(z) = \frac{1}{16} \cdot \frac{(1-z^{-2})}{(1-z^{-1})}$$

$$= \frac{1}{16} \cdot (1+z^{-1})$$

is obtained.

Next, as first characteristics, if $$Hs(z) = \frac{(1-\alpha)}{(1-\alpha \cdot z^{-1})}$$

is defined, $$Hp(z) = \frac{(1-\alpha)}{(1-\alpha \cdot z^{-1})} \cdot \frac{(1-z^{-1})}{1-z^{-1} \cdot \frac{(1-\alpha)}{(1-\alpha \cdot z^{-1})}}$$

$$= (1-\alpha).$$

Therefore, $$S(z)=(1-\alpha) \cdot D(z).$$

As a result, the amount of skew is decided by weighting the current $D(n)$ with $(1-\alpha)$.

Further, in order that a second Butterworth low-pass characteristics is obtained, $$Hs(z) = \frac{(1-\alpha+\beta)}{4} \cdot \frac{(1+z^{-1})^2}{(1-\alpha \cdot z^{-1} + \beta \cdot z^{-2})},$$

and $$Hp(z) = k \cdot \frac{(1+z^{-1})^2}{(1-\alpha \cdot z^{-1}+\beta \cdot z^{-2})} \cdot \frac{(1-z^{-1})}{1-k \cdot z^{-1} \cdot \frac{(1+z^{-1})^2}{(1-\alpha \cdot z^{-1}+\beta \cdot z^{-2})}}$$

$$= k \cdot \frac{(1+z^{-1})^2 \cdot (1-z^{-1})}{1-(\alpha+k) \cdot z^{-1} + (\beta-2k) \cdot z^{-2} - kz^{-3}}$$

$$= \frac{(1-\alpha+\beta)}{4} \cdot$$

$$\frac{(1+z^{-1})^2 \cdot (1-z^{-1})}{1 - \frac{(1+3\alpha+\beta)}{4} \cdot z^{-1} - \frac{(1-\alpha-\beta)}{2} \cdot z^{-2} \cdot \frac{(1-\alpha-\beta)}{4} \cdot z^{-3}}.$$

Thus, the amount of skew is decided by S(n) which is obtained by subjecting D(n) as input to a third IIR (Infinite Impulse Response) filter as Hp(z).

When receiving an output signal from the difference measuring unit 22, the digital filtering unit 26 performs filtering to the output signal from the difference measuring unit 22. Specifically, the DFF 23 holds time difference data from the difference measuring unit 22 for a field or frame. The adding unit 24 adds current time difference data and time difference data a field or frame before, output from the DFF 23, and outputs the result. The dividing unit 25 divides the result of the addition by eight, and outputs the result. This result of the division is the number of clocks representing the amount of skew.

In order to match the result of filtering by the digital filtering unit 26 to the amount of skew of a current field or frame, the synchronizing signal generating unit 9 generates a synchronizing signal for a video signal based on the result of filtering by the digital filtering unit 26 and the number of clocks in operation calculated in the operating clock number calculating unit 20, and outputs the generated synchronizing signal to the encoding unit 13. To be specific, the number of clocks for skew from the digital filtering unit 26 is regarded as the number of clocks in a certain line, and the number of clocks in operation calculated by the operating clock number calculating unit 20 is regarded as the number of clocks in a line other than the certain line, thereby producing a synchronizing signal. Therefore, the length of a line of a field or frame becomes constant other than the certain line, so skew occurs only on the certain line.

The digital video signal Sin is supplied to the encoding unit 13 through the second input terminal 14. The encoding unit 13 adds the synchronizing signal to the luminance signal of the digital video signal Sin and converts the result to an analog signal, while modulating two kinds of the color difference signal Cr and Cb of the digital video signal Sin to produce a chrominance signal, and converting the chrominance signal to an analog signal. The output signal of the encoding unit 13 is supplied to the output terminal 15.

That is, in the third embodiment, a frame dividing signal or a field dividing signal for a video signal is generated according to a signal with stable frequency and the number of clocks in operation, and a time difference between the generated dividing signal, and a frame dividing signal or a field dividing signal, is measured. The time difference is subjected to filtering to be smoothed. The smoothed time difference is regarded as the amount of skew of a current frame or field.

Thus, filtering rejects the high frequency component of the shake of frame or field signals successively supplied from the outside, so skew is directly suppressed on a TV screen without outputting the shake of the frame signal supplied from the outside as it is. Thereby, between fields or frames, the amount of skew or the shake along the direction of skew occurring, which occurs when the shake of a field or frame signal is very quick, can be suppressed. As a result, stable video can be displayed on a TV screen.

Note that although the third embodiment adopts the digital filtering unit having f characteristics set by $\alpha=\frac{7}{8}$ and $\beta=\frac{1}{8}$, because the more $\alpha$ closes to 1 where $\alpha+\beta=1$, the more the f characteristics becomes steep, any characteristics can be produced, so any type of a digital filtering unit, such as a digital filtering unit having transfer characteristics of $D(n)/4$, the output of a difference measuring unit being $D(n)$, can be adopted.

[Embodiment 4]

Figure 4:
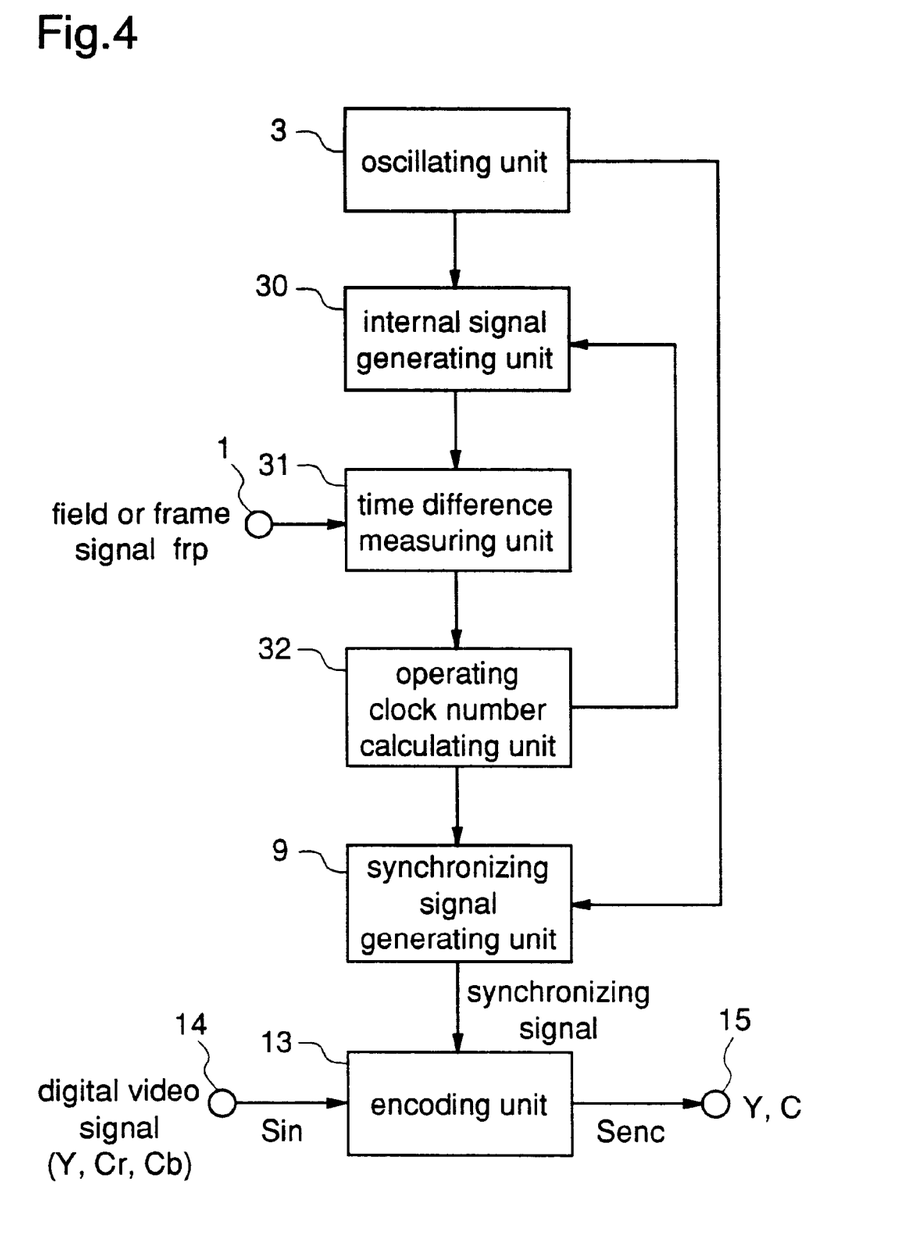
FIG. 4 is a block diagram showing a structure of a video signal processing apparatus in accordance with a fourth embodiment of this invention.

FIG. 4 is a block diagram showing a structure of a video signal processing apparatus in accordance with a fourth embodiment of this invention.

The video signal processing apparatus comprises an input terminal 1, an oscillating unit 3, an operating clock number calculating unit 32, an internal signal generating unit 30, a difference measuring unit 31, a synchronizing signal generating unit 9, an output terminal 33, a second input terminal 14, an encoding unit 13, and an output terminal 15. The input terminal 1 is supplied with a field or frame signal. The oscillating unit 3 outputs a clock signal CLK having crystal precision. The operating clock number calculating unit 32 calculates the number of clocks in operation. The internal signal generating unit 30, based on the number of clocks in operation calculated in the operating clock number calculating unit 32 and the clock signal CLK output from the oscillating unit 3, generates a dividing signal for dividing a frame or a dividing signal for dividing a field (hereinafter referred to as "internally generated dividing signal" generally for both signals). The difference measuring unit 31 measures a difference in time between the internally generated dividing signal generated in the internal signal generating unit 30, and a dividing signal for dividing a frame or a dividing signal for dividing a field, supplied from the input terminal 1, (hereinafter referred to as "external input dividing signal" generally for both signals). The synchronizing signal generating unit 9 generates a synchronizing signal for a video signal, based on the number of clocks in operation calculated in the operating clock number calculating unit 32 and a signal output from the oscillating unit 3, to generate a synchronizing signal for a video signal. The second input terminal 14 is supplied with a digitized video signal Sin comprising a luminance signal Y and two sorts of color difference signals Cr and Cb. The encoding unit 13 adds the synchronizing signal supplied from the synchronizing signal generating unit 9 to the luminance signal Y of the digital video signal Sin, and converts the result to an analog signal, while modulating the two sorts of color difference signals Cr and Cb of the digital video signal Sin to produce a chrominance signal, and converting the chrominance signal to an analog signal. The output terminal 15 is supplied with the output signal of the encoding unit 13, i.e., the analog luminance signal and the analog chrominance signal.

The operating clock number calculating unit 32 controls the length of a line by adjusting the number of clocks in the next operation in a way to reduce error information which is the time difference measured in the time difference measuring unit 31. Hence, to reduce the time difference, the operating clock number calculating unit 32, for instance, performs filtering to the error information, or compares the error information with a threshold, to change the number of clocks in a line in a way in which the number of clocks in the next operation is adjusted. The number of clocks in the next operation adjusted by the operating clock number calculating unit 32 is output through the output terminal 33.

The operation of the video signal processing apparatus will be described.

The oscillating unit 3 output a clock signal CLK with crystal precision. The operating clock number calculating unit 32 calculates the number of clocks in operation.

The internal signal generating unit 30 generates an internally generated dividing signal, based on the number of clocks in operation calculated in the operating clock number calculating unit 32 and the clock signal CLK output from the oscillating unit 3.

The difference measuring unit 31 measures a difference in the time of the internally generated dividing signal generated in the internal signal generating unit 30 and the external input dividing signal supplied through the input terminal 1, and outputs the measured time difference.

The operating clock number calculating unit 32 controls the length of a line by adjusting the number of clocks in the next operation in a way to reduce error information which is the time difference measured in the time difference measuring unit 31, and outputs the controlled number of clocks in the next operation to the synchronizing signal generating unit 9.

The synchronizing signal generating unit 9, based on the number of clocks calculated in the operating clock number calculating unit 32 and a signal output from the oscillating unit 3, generates a synchronizing signal for a video signal, and outputs the generated synchronizing signal to the encoding unit 13. The digital video signal Sin is supplied to the encoding unit 13 through the second input terminal 14. The encoding unit 13 adds the synchronizing signal to the luminance signal of the digital video signal Sin, and converts the result to an analog signal, while modulating two kinds of the color difference signal Cr and Cb of the digital video signal Sin to produce a chrominance signal, and converting the chrominance signal to an analog signal. The output signal of the encoding unit 13 is supplied to the output terminal 15.

In the fourth embodiment, a time difference between a frame dividing signal or a field dividing signal generated according to a signal of a stable frequency and the number of clocks in the current operation, and a frame signal or a field signal supplied from the outside, is measured. This measured value is regarded as error information. To reduce the error information, the length of a line, i.e., the number of clocks, is controlled by adjusting the number of clocks in the next operation.

Thus, a small-scale circuit can remove a side-to-side shake on a TV screen caused by the shake of a frame signal supplied from the outside. As a result, stable video is displayed on a TV screen.

The present embodiments are to be considered in all respects as illustrative and not restrictive. Various changes and modifications can come within the meaning and range of equivalency of the claims of this invention.

What is claimed is:

1. A video signal processing apparatus comprising:
   an oscillating unit for outputting a signal of a stable frequency;
   a counting unit for counting the period of a cycle of a signal supplied from the outside based on the signal output by said oscillating unit;

a clock number calculating unit for calculating the number of clocks in a line based on a result of counting by said counting unit;

a comparing unit for comparing the number of clocks calculated by said clock number calculating unit with a threshold to decide which is larger;

an operating clock number deciding unit for deciding the number of clocks in a next operation by switching to the number of clocks calculated by said clock number calculating unit if the calculated number of clocks is larger than the threshold, or deciding the number of clocks in the next operation by holding the number of clocks in a line in a current operation as it is; and a synchronizing signal generating unit for, based on the number of clocks in operation decided by said operating clock number deciding unit and the signal output by said oscillating unit, generating a synchronizing signal for a video signal.

2. A video signal processing apparatus comprising:

an oscillating unit for outputting a signal of a stable frequency;

a counting unit for counting the period of a cycle of a signal supplied from the outside based on the signal output by said oscillating unit;

a filtering unit for receiving and filtering the number of counts counted by said counting unit;

a clock number calculating unit for calculating the number of clocks in a line based on the result of filtering by said filtering unit;

a synchronizing signal generating unit for, based on the number of clocks calculated by said clock number calculating unit and the signal output by said oscillating unit, generating a synchronizing signal for a video signal.

3. A video signal processing apparatus comprising:

an oscillating unit for outputting a signal of a stable frequency;

an operating clock number calculating unit for calculating the number of clocks in operation;

an internal signal generating unit for generating a dividing signal for dividing a frame or a dividing signal for dividing a field, based on the number of clocks in operation calculated by said operating clock number calculating unit and a signal output by said oscillating unit;

a time difference measuring unit for measuring a difference in time between the dividing signal generated by said internal signal generating unit, and a dividing signal for dividing a frame or a dividing signal for dividing a field, supplied from the outside;

a filtering unit for receiving and filtering a signal output by said time difference measuring unit; and a synchronizing signal generating unit for, based on a result of filtering by said filtering unit and the number of clocks in operation calculated by said operating clock number calculating unit, generating a synchronizing signal for a video signal to match the result of filtering by said filtering unit to the amount of skew of a current field or frame.

4. A video signal processing apparatus comprising:

an oscillating unit for outputting a signal of a stable frequency;

an operating clock number calculating unit for calculating the number of clocks in operation;

an internal signal generating unit for generating a dividing signal for dividing a frame or a dividing signal for dividing a field, based on the number of clocks in operation calculated by said operating clock number calculating unit and a signal output by said oscillating unit;

a time difference measuring unit for measuring a difference in time between the dividing signal generated by said internal signal generating unit, and a dividing signal for dividing a frame or a dividing signal for dividing a field;

said operating clock number calculating unit controlling the length of a line by adjusting the number of clocks in the next operation, the time difference measured by said time difference measuring unit being regarded as error information, to reduce the error information.

* * * * *